United States Patent [19]

Finke

[11] Patent Number: 4,942,832
[45] Date of Patent: Jul. 24, 1990

[54] METHOD AND DEVICE FOR CONTROLLING NOX EMISSIONS BY VITIATION

[75] Inventor: Harry P. Finke, Allegheny County, Pa.

[73] Assignee: Bloom Engineering Company, Inc., Pittsburgh, Pa.

[21] Appl. No.: 347,408

[22] Filed: May 4, 1989

[51] Int. Cl.⁵ ............................................. F23N 5/02
[52] U.S. Cl. ................................. 110/190; 236/15 E; 431/115
[58] Field of Search .................... 236/15 BD, 1.5 E; 431/115; 110/190

[56] References Cited

U.S. PATENT DOCUMENTS

| | | | |
|---|---|---|---|
| 3,146,821 | 9/1964 | Wuetig | 158/1 |
| 3,760,776 | 9/1973 | Durrant | 122/459 |
| 3,880,570 | 4/1975 | Marshall | 431/4 |
| 4,030,874 | 6/1977 | Vollerin | 431/9 |
| 4,100,741 | 7/1978 | Michels | 780/702 |
| 4,135,874 | 1/1979 | Tsuzi et al. | 431/115 |
| 4,357,134 | 11/1982 | Katsushige et al. | 431/9 |
| 4,424,754 | 1/1984 | Coleman | 110/190 |
| 4,445,843 | 5/1984 | Nutcher | 431/115 |
| 4,585,161 | 4/1986 | Kusama et al. | 236/15 |
| 4,588,372 | 5/1986 | Torborg | 431/78 |
| 4,631,022 | 12/1986 | Ferri et al. | 431/12 |
| 4,645,450 | 2/1987 | West | 431/12 |
| 4,659,305 | 4/1987 | Nelson et al. | 431/9 |
| 4,673,348 | 6/1987 | Riley et al. | 431/115 |
| 4,699,071 | 10/1987 | Vier et al. | 110/345 |
| 4,728,282 | 3/1988 | May | 431/115 X |

FOREIGN PATENT DOCUMENTS 0050033 4/1977 Japan ................................ 431/115

OTHER PUBLICATIONS

Low NOx Burners Metallurgical and Process Furnaces, Hovis 7/30/85.

*Primary Examiner*—William E. Wayner
*Attorney, Agent, or Firm*—Webb, Burden, Ziesenheim & Webb

[57] ABSTRACT

A furnace for controlling flame temperature and emission of NOx comprising a burner to which fuel and air are supplied and product of combustion are discharged, wherein said air is vitiated with said products of combustion; a means for sensing furnace operating parameters including a flow rate sensor for sensing a flow rate of fuel to said burner and a first temperature sensor for sensing furnace temperature; and a means for controlling the amount of air vitiated with products of combustion, said controlling means in communication with said sensing means such that the amount of products of combustion vitiated with the air is controlled as a function of at least one of the rate of flow of fuel to said burner, the air temperature, and the furnace temperature, said control means is responsive throughout a firing range of said burner.

20 Claims, 1 Drawing Sheet

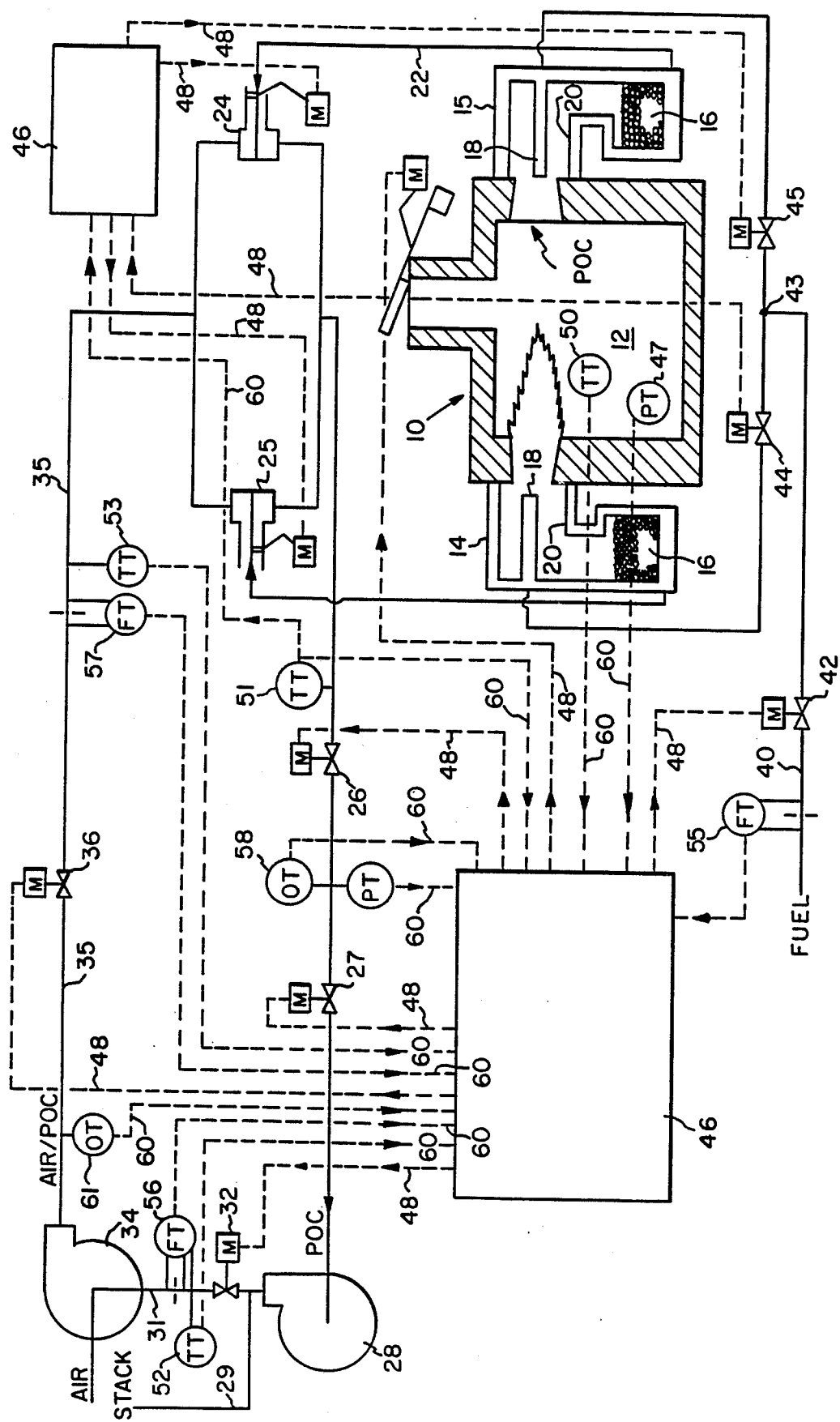

METHOD AND DEVICE FOR CONTROLLING NOX EMISSIONS BY VITIATION

BACKGROUND OF THE INVENTION

1. Field of the Invention

This invention relates to a method and device for controlling NOx emissions by vitiation. More particularly, this invention relates to a method and device for controlling NOx emissions by vitiation of combustion sustaining air with a controlled amount of products of combustion.

2. Description of the Prior Art

The concept of vitiation of combustion air with products of combustion to control NOx emissions is known. The products of combustion are used as a source of inert gas introduced into the air supplied for combustion to reduce or eliminate the formation of NOx. The products of combustion dilute the oxygen content, thereby lowering the concentration of oxygen in the combustion air. The resulting products of combustion/combustion air mixture reduces the flame temperature of a burner thereby controlling the evolution and, in turn, the emission of NOx.

Using this general principle, numerous attempts have been made to reduce and minimize the formation of oxides of nitrogen from the fuel and air during combustion by vitiation of combustion air with products of combustion. The present invention is a method for simply and efficiently controlling vitiation of combustion air to reduce or eliminate NOx formation. More particularly, the present invention relates to a method and device for controlling the quantity of recirculating products of combustion as a function of at least one of air preheat temperature, fuel input rate and furnace temperature to provide a reduction in NOx emissions in either a regenerative burner system, non-regenerative burner system, direct fired, or radiant tube fired system.

Accordingly, it is an object of the present invention to provide a method for reducing NOx emissions by controlling the amount of products of combustion recirculated to the furnace as a function of at least one of furnace temperature, air preheat temperature and fuel flow rate. Another object of the present invention is to provide an NOx reduction system and method for reducing NOx emissions which can be incorporated into both regenerative and non-regenerative, and both direct fired and radiant tube fired burner systems.

SUMMARY OF THE INVENTION

Briefly, according to this invention, there is provided a method and device for controlling the quantity of products of combustion vitiated with the combustion air as a function of at least one of air preheat temperature, furnace temperature and fuel input rate throughout the firing range of the burner. A furnace for controlling flame temperature and emission of NOx includes a burner to which fuel and air are supplied to create combustion and from which spent products of combustion are discharged, the air being vitiated with the products of combustion. A means for sensing furnace operating parameters including a flow rate sensor for sensing a flow rate of fuel to the burner and a first temperature sensor for sensing furnace temperature is provided. A means for controlling the amount of products of combustion vitiated with the air is also provided and is in communication with the sensing means such that the amount of products of combustion vitiated with the air may be controlled as a function of at least one of the rate of flow of fuel to the burner, the furnace temperature, and the air temperature. The control means is responsive throughout the firing range of the burner.

BRIEF DESCRIPTION OF THE DRAWING

Further features and other objects and advantages of this invention will become clear from the following detailed description made with reference to the drawing of a regenerative burner system utilizing the teachings of the present invention.

DETAILED DESCRIPTION OF THE PREFERRED EMBODIMENT

Referring to the drawing, wherein like reference characters represent like elements. The drawing shows a system for controlling vitiation of combustion air with recirculated products of combustion for combustion. Before proceeding further, it should be understood that the drawing illustrates the main elements in a regenerative burner system employing the teachings of the present invention. For purposes of clarity, elements of a regenerative burner system well known to one skilled in the art have been omitted from the detailed description and drawing of the present invention. For example, furnace pressure valves and other basic cycling valves not directly related to the present invention are not illustrated in detail. Furthermore, so that the features of the present invention may be more fully appreciated, the present invention is only shown in connection with a regenerative burner system, but it will be appreciated by one skilled in the art that the present invention may also be used in association with a non-regenerative, direct fired, or radiant tube fired system equally as well.

The drawing shows a furnace 10 including a furnace chamber 12 and a pair of regenerative burners 14 and 15. Burner 14 is in the firing mode and burner 15 is in the regenerating mode. Each regenerative burner is connected to an immediately adjacent regenerative bed 16 through which a combustion sustaining mixture of combustion air/products of combustion pass. The combustion sustaining mixture is provided to one burner at a time so that when the left burner 14 is firing, the right burner 15 functions as a flue for the furnace chamber 12. When the left burner 14 fires, the regenerative bed 16 of the right burner 15 collects heat from the products of combustion flowing from the left burner 14. When flow in the furnace 10 is reversed, the right regenerative bed 16 preheats combustion air for the left regenerative burner 15.

The burners 14 and 15 as shown, each include a fuel nozzle 18 which introduces fuel into a burner body 20 for combustion. The fuel nozzle 18 may be either insulated or air cooled by means known in the art. The burners 14 and 15 are constructed of a fabricated metal outer casing and are fully insulated with a suitable insulating material. The fuel nozzles 18 are fabricated of standard materials including metals, such metal structures are either adequately insulated or air cooled when fully exposed, or are embedded in or shielded with refractory material. Refractory materials are well known in the art and generally include ceramic compositions prepared to specifications required for particular process applications. The materials suitable for use in the fabrication of the regenerative bed 16 are also known in the art. The fuels which can be used in the furnace for combustion include gas and oil.

In a dual burner regenerative system, in which the left burner 14 is firing and the right burner 15 is acting as an exhaust, products of combustion formed by the combustion of a fuel in the left burner flow from furnace chamber 12 into regenerator bed 16 of right burner 15 wherein heat is absorbed into the regenerative bed. Products of combustion then flow by way of conduit 22 through first reversing valve 24 and then through first and second control valves 26 and 27 to products of combustion blower 28. The products of combustion flowing from products of combustion blower 28 may flow through conduit 29 to a stack to be exhausted or flow through conduit 31 and vitiation control valve 32 to air/products of combustion blower 34. The air/products of combustion blower 34 is in communication with an external air source and induces products of combustion from vitiation control valve 32 to mix and vitiate external air. It will be appreciated that when vitiation control valve 32 is open, air/products of combustion blower 34 creates a vacuum in conduit 31 drawing products of combustion toward blower instead of through exhaust conduit 29. Vitiated combustion air flows from air/products of combustion blower 34 through conduit 35, third control valve 36 and to second reversing valve 25. The air/products of combustion blower 34 operates to feed the vitiated air at a given mass-flow rate under pressure to the burner 14 to which fuel is also fed at a constant mass-flow rate. The vitiated combustion air then flows from reversing valve 25 back to left burner 14 as the combustion sustaining air mixture.

The valves used in the present invention may be gate valves and the like and are modulated by means of suitable motors (not shown).

Fuel from a fuel source flows through a conduit 40, fuel control valve 42 to a tee 43 and then to either first fuel valve 44 or second fuel valve 45. As shown, fuel valve 44 is in the open position to direct fuel to left firing burner 14 for combustion. It will be appreciated that when right burner 15 is firing and left burner 14 is acting as a flue, fuel valve 45 is switched to the open position and fuel valve 44 is switched to the closed position to divert fuel to the right burner and reversing valves 24 and 25 are reversed to divert vitiated combustion air to the right burner 15 and products of combustion from the left burner 14 to products of combustion blower 28 through conduit 22 as previously described.

Vitiation of the combustion air is controlled by a micro-computer 46. The micro-computer evaluates various operating furnace parameters supplied by sensors positioned within the furnace system to determine the ideal quantity of vitiated combustion air to be supplied to the burner to minimize NOx emissions. Each of the valves 24, 25, 26, 27, 32, 36, 44 and 45 of the furnace are in communication with an output 48 of the microcomputer 46. The output of the micro-computer is connected to the motor-operated valves through an appropriate commercially available interface card.

The sensors are positioned throughout the furnace to measure flow rate, temperature, oxygen concentration and pressure. Each of the sensors may be electrically, pneumatically or optically connected to an input 60 to the micro-computer.

A first temperature sensor 50, as shown, is in communication with the furnace chamber 12 to monitor furnace temperature and thereby determine the substantially equivalent regenerative air preheat temperature. It will be appreciated that in a recuperative system an additional temperature sensor will be needed to monitor air preheat temperature because air preheat temperature may vary while furnace temperature is constant. A second 51, third 52 and fourth 53 temperature sensor are also interposed within conduit 22 between first reversing valve 24 and first control valve 26, vitiation control valve 32 and air/products of combustion blower 34, and third control valve 36 and first reversing valve 24, respectively.

Three flow rate sensors are positioned throughout the furnace. A first flow rate sensor 55 is interposed within conduit 40 between fuel source and fuel control valve 42 to monitor fuel flow rate. A second and third flow rate sensor 56 and 57 are interposed within conduit 31 between third temperature sensor 52 and air/products of combustion blower 34 and between third control valve 36 and fourth temperature sensor 53, respectively. A first oxygen level sensor 58 is interposed within conduit between first and second control valve 26 and 27, respectively. The first oxygen sensor 58 monitors the quantity of oxygen available in the products of combustion flowing from the burner 14 to support further combustion. A second oxygen sensor 61 is positioned between air/products of combustion blower 34 and control valve 36. Second oxygen sensor 61 monitors oxygen in the vitiated air stream and communicates the measured process variable to the micro computer 46. A pressure sensor 47 is positioned within furnace chamber 12 and communicates the measured pressure within the chamber to the micro computer 46. The output signals from the sensors are transmitted to the micro-computer 46 through input cables 60. The micro-computer, in response to the input signals from the sensors, controls the mass balance of oxygen to fuel within the burner 14 by regulating the amount of products of combustion recirculated as a function of at least one of furnace temperature, fuel flow rate, and air preheat temperature, and by controlling the total vitiated air stream flow to the burner with third control valve 36.

The micro-computer 46 is programmed to control the vitiated airstream of oxygen content to fuel by the equation $Q_{rpoc} = a(Q_f)^b (T_{fce})^c$. The constants a, b, c are determined through theoretical analysis and performance characteristics of the specific burner and regenerator design utilized. Qrpoc represents the amount of products of combustion recirculated, $Q_f$ represents fuel flow rate and $T_{fce}$ represents the temperature of the furnace. It will be appreciated that the ideal quantity of recirculated products of combustion may be expressed by the above equation or set forth in a dimensional array that has furnace temperature vs. firing rate and the appropriate ratio of ideal products of combustion recirculated to air flow. As previously mentioned, in a recuperated system the air preheat temperature is not necessarily a function of the furnace temperature thereby requiring separate temperature measurements for the furnace and preheated air. Therefore, in a recuperated system, the equation would be $Q_{rpoc} = a (Q_f)^b (T_{fce})^c (T_{air})^d$. The constants a, b, c, and d are also determined through theoretical analysis and performance characteristics of the recuperated system. $T_{air}$ represents air preheat temperature. The array of data would be a three dimensional array.

After the micro-computer 46 has been programmed with the optimal combinations of air and products of combustion as a function of temperature and flow rates, the micro-computer synthesizes the information from the sensors to determine the proper quantity of vitiated air flowing to the burner 14. More particularly, the amount of vitiation is controlled by the micro-computer electromechanically adjusting the valves of the furnace 10 until the preprogrammed ideal relationships between flow rates, temperatures and oxygen level as sensed by the flow rate sensors 55, 56, and 57, temperature sensors 50, 51, 52, 53 and oxygen sensors 58 and 61 are achieved.

The fuel flow is regulated by fuel control valve 42 in response to the fuel flow rate determined by the micro-computer 46. Vitiation control valve 32 regulates the amount of products of combustion recirculated to the burner 14 in response to the furnace temperature and fuel flow rate transmitted by temperature sensor 56 and fuel flow rate sensor 55 to the micro-computer 46. Third control valve 36 controls the required quantity of vitiated air flowing to the burner 14 in response to the required flow rate determined by the microcomputer 46. The first and second control valves 26 and 27 control the flow of products of combustion to products of combustion blower 28 from the burner 15.

In accordance with the invention, the optimal ratio of mass flow of recirculated products of combustion to air may be determined and then fed under pressure, as the combustion sustaining air to the burner 14 where it is burned. Furthermore, variations in furnace temperature, flow rate and oxygen level may be detected and the ratio of the above mentioned mass flows simply and efficiently controlled in response to a change in temperature, flow rate and oxygen level to control NOx emissions.

Having described presently preferred embodiments of the invention, it is to be understood that it may be otherwise embodied within the scope of the appended claims.

I claim:

1. A furnace for controlling flame temperature and emission of $NO_x$ comprising:
   a. at least one burner to which fuel and air are supplied and products of combustion are discharged, wherein said air is vitiated with said products of combustion; and
   b. means for controlling the amount of vitiation with said products of combustion as a function of at least two of an air preheat temperature, a furnace temperature and a fuel flow rate.

2. The furnace as set forth in claim 1 wherein the amount of vitiation is controlled as a function of furnace temperature or air preheat temperature and fuel flow rate.

3. The furnace as set forth in claim 1 further comprising:
   a. a means for sensing furnace operating parameters including a flow rate sensor for sensing a flow rate of fuel to said burner and a first temperature sensor for sensing furnace temperature; wherein said means for controlling the amount of products of combustion vitiated with the air is in communication with said sensing means such that the amount of products of combustion vitiated with the air is controlled as a function of at least two of the rate of flow of fuel to said burner, the furnace temperature and air preheat temperature, said control means is responsive throughout a firing range of said burner.

4. The furnace set forth in claim 3 wherein said controlling means includes a valve means for directing and modulating the flow of fuel, air and vitiated air to said furnace and a micro-computer in communication with said valve means.

5. The furnace set forth in claim 4 wherein said sensing means is connected pneumatically, optically, or electrically to an input of said micro-computer.

6. The furnace set forth in claim 5 wherein said sensing means further comprises an oxygen sensor for sensing the quantity of oxygen present in the products of combustion discharged from said burner.

7. The furnace as set forth in claim 6 wherein said controlling means is capable of controlling the flow of air and fuel through separate conduits to said burner, said controlling means including a first and second electrically operative valve for modulating the flow of air and fuel, respectively, to the burner and a microcomputer separately connected to said air flow and fuel flow indicating means and said first and second valves for maintaining an optimal amount of recirculated products of combustion to air as a function of at least one of furnace temperature, air preheat temperature and fuel flow rate by modulating said valves throughout a firing range of said burner.

8. The furnace as set forth in claim 7 wherein said controlling means controls the amount of products of combustion vitiated with the air by comparison of at least one of the furnace temperature, the fuel flow rate and the air preheat temperature with at least one of precalibrated furnace temperature, fuel flow rate, and air preheat temperature.

9. A process for controlling flame temperature and $NO_x$ emissions from a burner by controlling the amount of products of combustion vitiated with air supplied to a burner as a function of at least two of a furnace temperature, air preheat temperature and a fuel flow rate.

10. The process as set forth in claim 9 wherein the amount of products of combustion is vitiated with air supplied to a burner as a function of furnace temperature or air preheat temperature and a fuel flow rate.

11. A process for controlling vitiation of combustion air to a burner of a furnace having first and second valves for controlling air and fuel flow to the burner, first and second temperature and flow rate sensors for sensing temperature and flow rate of the products of combustion and fuel, respectively, wherein said sensors are connected downstream of said first and second valves, and a vitiation controller including a micro-computer having an input which is connected to the temperature and flow rate sensors and an output which is connected to first and second valves, comprising the steps of:
   (a) deriving an optimal quantity of recirculated products of combustion by measuring at least one of furnace temperature, air preheat temperature and fuel flow rate for the furnace across the operating firing range of the burner;
   (b) entering the measurements derived at step (a) into the micro-computer; and
   (c) adjusting the position of first and second valves by means of the micro-computer in response to the measurements to provide an optimal quantity of recirculated products of combustion.

12. A furnace for controlling flame temperature and emission of NOx comprising:
   a. at least one burner to which fuel and air are supplied and products of combustion are discharged, wherein said air is vitiated with said products of combustion; and b. means for controlling the amount of vitiation with said products of combustion as a function of furnace temperature, air pre-heat temperature, and fuel flow rate.

13. The furnace as set forth in claim 12 further comprising:
   a. a means for sensing furnace operating parameters including a flow rate sensor for sensing a flow rate of fuel to said burner and a first temperature sensor for sensing furnace temperature; wherein said means for controlling the amount of products of combustion vitiated with the air is in communication with said sensing means such that the amount of products of combustion vitiated with the air is controlled as a function of the rate of flow of fuel to said burner and the furnace temperature or air pre-heat temperature, said controlling means being responsive throughout a firing range of said burner.

14. The furnace set forth in claim 13, wherein the amount of products of combustion vitiated with the air is controlled as a function of the rate of flow of fuel to said burner, the furnace temperature, and the air pre-heat temperature.

15. A process for controlling flame temperature and NOx emissions from a burner by controlling the amount of products of combustion vitiated with air supplied to a burner as a function of furnace temperature, air pre-heat temperature and fuel flow rate.

16. The process as set forth in claim 15 wherein the amount of products of combustion vitiated with air supplied to a burner is defined by an equation $Q_{rpoc} = a(Q_f)^b (T_{fce})^c$ where the constants a, b, and c are determined through theoretical analysis and performance characteristics of the furnace and $Q_{rpoc}$ represents the amount of products of combustion recirculated, $Q_f$ represents fuel flow rate and $T_{fce}$ represents the temperature of the furnace.

17. The process as set forth in claim 15 wherein the amount of products of combustion vitiated with air supplied to a burner is defined by an equation $Q_{rpoc} = a(Q_f)^b (T_{fce})^c (T_{air})^d$ where the constants a, b, c, and d are determined through theoretical analysis and performance characteristics of the furnace and $Q_{rpoc}$ represents the amount of products of combustion recirculated, $Q_f$ represents fuel flow rate, $T_{fce}$ represents the temperature of the furnace, and $T_{air}$ represents the temperature of the pre-heat.

18. A process for controlling flame temperature and emission of NOx from a burner of a furnace comprising:
   a. supplying fuel and air to the burner and discharging products of combustion from said burner;
   b. vitiating said air with said discharged products of combustion;
   c. sensing furnace operating parameters including fuel flow rate, furnace temperature, and pre-heat temperature; and
   d. controlling the amount of air vitiated with the products of combustion such that the amount of air vitiated with the products of combustion is controlled as a function of a rate of flow of fuel to said burner, the furnace temperature, and the pre-heat temperature throughout a firing range of said burner;
   e. entering the furnace operating parameters into a micro computer;
   f. deriving an optimal quantity of products of combustion to vitiate with said air as a function of the furnace operating parameters;
   g. signaling a valve means for directing and modulating the optimal flow of fuel, air and vitiated air supplied to said burner;

19. A furnace for controlling flame temperature and emission of $NO_x$ comprising:
   a. at least one burner to which fuel and air are supplied and products of combustion are discharged, wherein said air is vitiated with said products of combustion; and
   b. means for controlling the amount of vitiation with said products of combustion as a function of at least one of an air preheat temperature, a furnace temperature and a fuel flow rate, said means including a data feedback system which senses furnace operating parameters and adjusts the amount of products of combustion which vitiates combustion air so as to minimize $NO_x$ emission.

20. A process for controlling flame temperature and emission of $NO_x$ from a burner of a furnace comprising:
   a. supplying fuel and air to the burner and discharging products of combustion from said burner;
   b. vitiating said air with said discharged products of combustion supplied to said burner;
   c. sensing furnace operating parameters including at least one of fuel flow rate, furnace temperature, and preheat temperature; and
   d. controlling the amount of air vitiated with the products of combustion such that the amount of air vitiated with the products of combustion is controlled as a function of at least two of the rate of flow of fuel to said burner, the furnace temperature, and the preheat temperature throughout a firing range of said burner.

* * * * *

UNITED STATES PATENT AND TRADEMARK OFFICE
CERTIFICATE OF CORRECTION

PATENT NO. : 4,942,832

DATED : July 24, 1990

INVENTOR(S) : Harry P. Finke

It is certified that error appears in the above-identified patent and that said Letters Patent is hereby corrected as shown below:

Column 1 Line 45 "an" should read --a--.

Column 2 Line 50 "left" should read --right--.

Column 4 Line 27 "micro computer" should read --micro-computer--.

Column 4 Line 30 "micro computer" should read --micro-computer--.

Column 5 Line 18 "microcomputer" should read --micro-computer--.

Claim 7 Lines 15-16 Column 6 "microcom-puter" should read --micro-computer--.

Claim 18 c Line 5 Column 8 delete "and".

Claim 18 e Line 14 Column 8 "micro computer" should read --micro-computer--.

Claim 18 f Line 17 Column 8 after "parameters;" insert --and--.

Claim 18 g Line 20 Column 8 "burner;" should read --burner.--.

Signed and Sealed this

Seventh Day of January, 1992

*Attest:*

HARRY F. MANBECK, JR.

*Attesting Officer*   *Commissioner of Patents and Trademarks*